United States Patent
Balakrishnan et al.

(10) Patent No.: US 11,171,696 B2
(45) Date of Patent: Nov. 9, 2021

(54) DISTRIBUTED MIMO LONG TRAINING FIELD METHOD AND SYSTEM

(71) Applicant: NXP USA, Inc., Austin, TX (US)

(72) Inventors: Hari Ram Balakrishnan, Chennai (IN); Sri Varsha Rottela, Visakhapatnam (IN); Ankit Sethi, Pune (IN); Vijay Ahirwar, Pune (IN); Nilesh Nilkanth Khude, Pune (IN); Sudhir Srinivasa, Los Gatos, CA (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/943,410

(22) Filed: Jul. 30, 2020

(65) Prior Publication Data

US 2021/0036744 A1 Feb. 4, 2021

Related U.S. Application Data

(60) Provisional application No. 62/880,444, filed on Jul. 30, 2019.

(51) Int. Cl.
| | |
|---|---|
| *H04L 5/00* | (2006.01) |
| *H04B 7/0452* | (2017.01) |
| *H04L 25/02* | (2006.01) |
| *H04L 25/03* | (2006.01) |

(52) U.S. Cl.
CPC ......... *H04B 7/0452* (2013.01); *H04L 5/0007* (2013.01); *H04L 25/0204* (2013.01); *H04L 25/03006* (2013.01); *H04L 2025/0377* (2013.01)

(58) Field of Classification Search
CPC ........... H04L 27/2613; H04L 5/0007; H04L 25/03006; H04L 2025/0377; H04L 25/0204

USPC .......... 375/260, 267, 340, 347, 350
See application file for complete search history.

(56) References Cited

U.S. PATENT DOCUMENTS

| | | | | |
|---|---|---|---|---|
| 8,514,765 | B1* | 8/2013 | Senarath | H04L 27/2656 370/315 |
| 2004/0161046 | A1* | 8/2004 | Schott | H04L 27/2662 375/260 |
| 2005/0220003 | A1* | 10/2005 | Palaskas | H04B 1/30 370/210 |
| 2010/0220683 | A1* | 9/2010 | Novak | H04L 1/1812 370/330 |
| 2010/0278288 | A1* | 11/2010 | Panicker | H04L 5/0051 375/343 |

(Continued)

OTHER PUBLICATIONS

Chen, et al.. "Discussions of Multi-AP JT" PowerPoint presentation created Jul. 15, 2019, 14 pages.

(Continued)

*Primary Examiner* — Emmanuel Bayard

(57) ABSTRACT

Various embodiments relate to a method for processing received distributed multiple-input and multiple-output (DMIMO) OFDM signals from a plurality of transmitters, including: performing an initial carrier frequency offset (CFO) correction; receiving a plurality of OFDM symbols; re-constructing the channel every N symbols based upon a channel estimate for each transmitter and an estimate of residual CFO for each of the transmitters based upon the long term fields (LTF), wherein N is an integer; and equalizing the received OFDM symbols using the re-constructed channel.

22 Claims, 4 Drawing Sheets

(56) References Cited

U.S. PATENT DOCUMENTS

| | | | | |
|---|---|---|---|---|
| 2011/0205955 A1* | 8/2011 | Xu | ............... | H04W 72/042 |
| | | | | 370/315 |
| 2012/0214524 A1* | 8/2012 | Wajcer | ............... | H04B 1/109 |
| | | | | 455/502 |
| 2015/0168537 A1* | 6/2015 | Amizur | ............... | G01S 5/14 |
| | | | | 455/456.2 |
| 2015/0236763 A1* | 8/2015 | Garrett | ............... | H04B 7/12 |
| | | | | 375/267 |
| 2016/0113003 A1* | 4/2016 | Lyons | ............... | H04L 1/08 |
| | | | | 375/267 |
| 2017/0012809 A1* | 1/2017 | Lyons | ............... | H04L 27/2672 |
| 2017/0373808 A1* | 12/2017 | Park | ............... | H04L 5/005 |
| 2018/0014216 A1* | 1/2018 | Banerjea | ............... | H04L 27/2602 |

OTHER PUBLICATIONS

Porat, et al. "Joint Processing MU-MIMO Simulations", PowerPoint Presentation created May 9, 2019, 8 pages. (IEEE 802.11-19/0800r0).

Sigurd Schelstraete, et al. "Nulling and coordinated beamforming" PowerPoint Presentation created Oct. 3, 2019, 11 pages. (IEE 802.11-19/0638).

U.S. Appl. No. 16/424,532, filed May 29, 2019.

U.S. Appl. No. 16/510,992, filed Jul. 15, 2019.

Zhang, et al. "AP Coordinated BF (Distributed MIMO)", Power Point Presentation created Sep. 2018, 13 pages. (IEEE 802.11-18/1510r1).

* cited by examiner

DISTRIBUTED MIMO LONG TRAINING FIELD METHOD AND SYSTEM

CROSS-REFERENCE TO RELATED APPLICATIONS

This application claims benefit to U.S. Provisional Patent Application No. 62/880,444 filed Jul. 30, 2019, the contents of which are hereby incorporated by reference for all purposes as if fully set forth herein.

TECHNICAL FIELD

Various exemplary embodiments disclosed herein relate generally to distributed MIMO long training field (LTF) methods and systems.

BACKGROUND

Multiple-input and multiple-output (MIMO) is a method for increasing the capacity of a radio link using multiple transmit and receive antennas to exploit multipath propagation. MIMO is currently used in a variety of standards, including for example, IEEE 802.11n (WiFi), IEEE 802.11ac (WiFi), 802.11ax (WiFi), HSPA+ (3G), WiMAX, and Long Term Evolution (4G LTE).

Distributed MIMO (DMIMO) is where multiple access points (APs) jointly transmit a download transmission to one station (STA). The use of additional APs and additional antennas allows for increased transmission power and gain. Further, the use of beam forming may further increase the gain of the antennas and hence increase performance.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a method for processing received distributed multiple-input and multiple-output (DMIMO) orthogonal frequency-division multiplexing (OFDM) signals from a plurality of transmitters, including: performing an initial carrier frequency offset (CFO) correction; receiving a plurality of OFDM symbols; estimating a residual CFO for each of the transmitters based upon a long training field (LTF); re-constructing the channel every N symbols based upon a channel estimate for each transmitter and the estimate of the residual CFO for each of the transmitters, wherein N is an integer; and equalizing the received OFDM symbols using the re-constructed channel.

Various embodiments are described, further including a plurality of LTFs wherein each LTF is associated with a transmitter of each of the plurality of transmitters and wherein estimating the residual CFO for each transmitter is based upon its associated set of LTF.

Various embodiments are described, further including a plurality of LTFs wherein each LTF is associated with a subset of transmitters the plurality of transmitters, wherein each of the plurality of LTFs associated with the subset of transmitters includes a plurality of subsets of interleaved frequency tones, wherein each of the plurality of subsets of interleaved frequency tones is associated with one transmitter in the subset of transmitters, and wherein the residual CFO estimate for each of the transmitters is based upon the subset frequency tones and LTF associated with the transmitter.

Various embodiments are described, wherein the LTF includes a plurality of subsets of interleaved frequency tones, each of the plurality of subsets is associated with one of the plurality of transmitter, and the residual CFO estimate for each of the transmitters is based upon the subset associated with the transmitter.

Various embodiments are described, wherein the channel estimate for each of the transmitters includes interpolating the channel estimate for frequency tones outside the subset of frequency tones for each transmitter.

Various embodiments are described, wherein estimating a residual CFO includes estimating the residual CFO for each of a plurality of subsets of received pilot tones and averaging the plurality of estimated residual CFOs for each of the plurality of subsets.

Various embodiments are described, wherein estimating a residual CFO includes assigning a pilot tone to each of the plurality of transmitters from a set of orthogonal transmit pilot tones and estimating the residual CFO for each of the plurality transmitters based upon the assigned pilot tone.

Various embodiments are described, further including receiving a mid-amble every M symbols, wherein the mid-amble is used to re-estimate the channel and M is an integer.

Various embodiments are described, wherein performing the initial CFO correction is part of a receiver initiated synchronization request.

Various embodiments are described, wherein performing the initial CFO correction is part of a master transmitter initiated synchronization request and wherein the receiver responds to the synchronization request.

Various embodiments are described, further including periodically receiving an STF sequence and adjusting the gain of the receiver based upon the received STF.\

Further various embodiments relate to a device for processing received distributed multiple-input and multiple-output (DMIMO) orthogonal frequency-division multiplexing (OFDM) signals from a plurality of transmitters, including: a receiver configured to: perform an initial carrier frequency offset (CFO) correction; receive a plurality of OFDM symbols; a residual CFO estimator configured to estimate a residual CFO for each of the transmitters based upon a long training field (LTF); a channel re-constructor configured to re-construct the channel every N symbols based upon a channel estimate for each transmitter and the estimate of the residual CFO for each of the transmitters, wherein N is an integer; and an equalizer configured to equalize the received OFDM symbols using the re-constructed channel.

Various embodiments are described, further including a plurality of LTFs wherein each LTF is associated with a transmitter of each of the plurality of transmitters and wherein estimating the residual CFO for each transmitter is based upon its associated set of LTF.

Various embodiments are described, further including a plurality of LTFs wherein each LTF is associated with a subset of transmitters the plurality of transmitters, wherein each of the plurality of LTFs associated with the subset of transmitters includes a plurality of subsets of interleaved frequency tones, wherein each of the plurality of subsets of interleaved frequency tones is associated with one transmitter in the subset of transmitters, and wherein the residual CFO estimate for each of the transmitters is based upon the subset frequency tones and LTF associated with the transmitter.

Various embodiments are described, wherein the LTF includes a plurality of subsets of interleaved frequency tones, each of the plurality of subsets is associated with one of the plurality of transmitter, and the residual CFO estimate for each of the transmitters is based upon the subset associated with the transmitter.

Various embodiments are described, wherein the channel estimate for each of the transmitters includes interpolating the channel estimate for frequency tones outside the subset of frequency tones for each transmitter.

Various embodiments are described, wherein estimating a residual CFO includes estimating the residual CFO for each of a plurality of subsets of received pilot tones and averaging the plurality of estimated residual CFOs for each of the plurality of subsets.

Various embodiments are described, wherein estimating a residual CFO includes assigning a pilot tone to each of the plurality of transmitters from a set of orthogonal transmit pilot tones and estimating the residual CFO for each of the plurality transmitters based upon the assigned pilot tone.

Various embodiments are described, wherein the processor is further configured to receive a mid-amble every M symbols, wherein the mid-amble is used to re-estimate the channel and M is an integer.

Various embodiments are described, wherein performing the initial CFO correction is part of a receiver initiated synchronization request.

Various embodiments are described, wherein performing the initial CFO correction is part of a master transmitter initiated synchronization request and wherein the receiver responds to the synchronization request.

Various embodiments are described, wherein the processor is further configured to periodically receive an STF sequence and adjust the gain of the receiver based upon the received STF.

Further various embodiments relate to a method for processing received distributed multiple-input and multiple-output (DMIMO) OFDM signals from a plurality of transmitters, including: performing an initial carrier frequency offset (CFO) correction; receiving a plurality of OFDM symbols; receiving a mid-able every M symbols, wherein the mid-amble is used to re-estimate the channel and M is an integer; and equalizing the received OFDM symbols using the re-estimated channel.

Various embodiments are described, wherein performing the initial CFO correction is part of a receiver initiated synchronization request.

Various embodiments are described, wherein performing the initial CFO correction is part of a master transmitter initiated synchronization request and wherein the receiver responds to the synchronization request.

Various embodiments are described, further including periodically receiving an STF sequence and adjusting the gain of the receiver based upon the received STF.

Further various embodiments relate to a method for transmitting distributed multiple-input and multiple-output (DMIMO) OFDM signals from a plurality of transmitters, including: performing a carrier frequency synchronization with another transmitter; receiving long training field (LTF) parameters for reconstruction of the channel; transmitting a plurality of OFDM symbols including LTFs, wherein the LTFs have parameters based upon the received LTF parameters that are unique to the transmitter.

Various embodiments are described, wherein the LTF parameters include an LTF timeslot for each of the transmitters.

Various embodiments are described, wherein the LTF parameters includes a set of frequency tones associated with the transmitter, the transmitted LTF uses the associated set of frequency tones, and the associated set of frequencies for the plurality of transmitters are interleaved.

Various embodiments are described, wherein the OFDM symbols are transmitted using a pilot tone associated with the transmitter from a set of orthogonal transmit pilot tones.

Various embodiments are described, wherein the LTF parameters include an LTF timeslot for each of the transmitters, the LTF parameters includes a set of frequency tones associated with the transmitter, the transmitted LTF uses the associated set of frequency tones, and the associated set of frequencies for the plurality of transmitters are interleaved.

Various embodiments are described, further including transmitting a mid-amble every M symbols, wherein the mid-amble is used to re-estimate the channel and M is an integer.

Various embodiments are described, wherein performing the initial CFO correction is part of a receiver initiated synchronization request.

Various embodiments are described, wherein performing a carrier frequency synchronization with another transmitter is part of a master transmitter initiated synchronization request and wherein the transmitter responds to the synchronization request.

Various embodiments are described, further including periodically transmitting an STF sequence.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Figure 1:
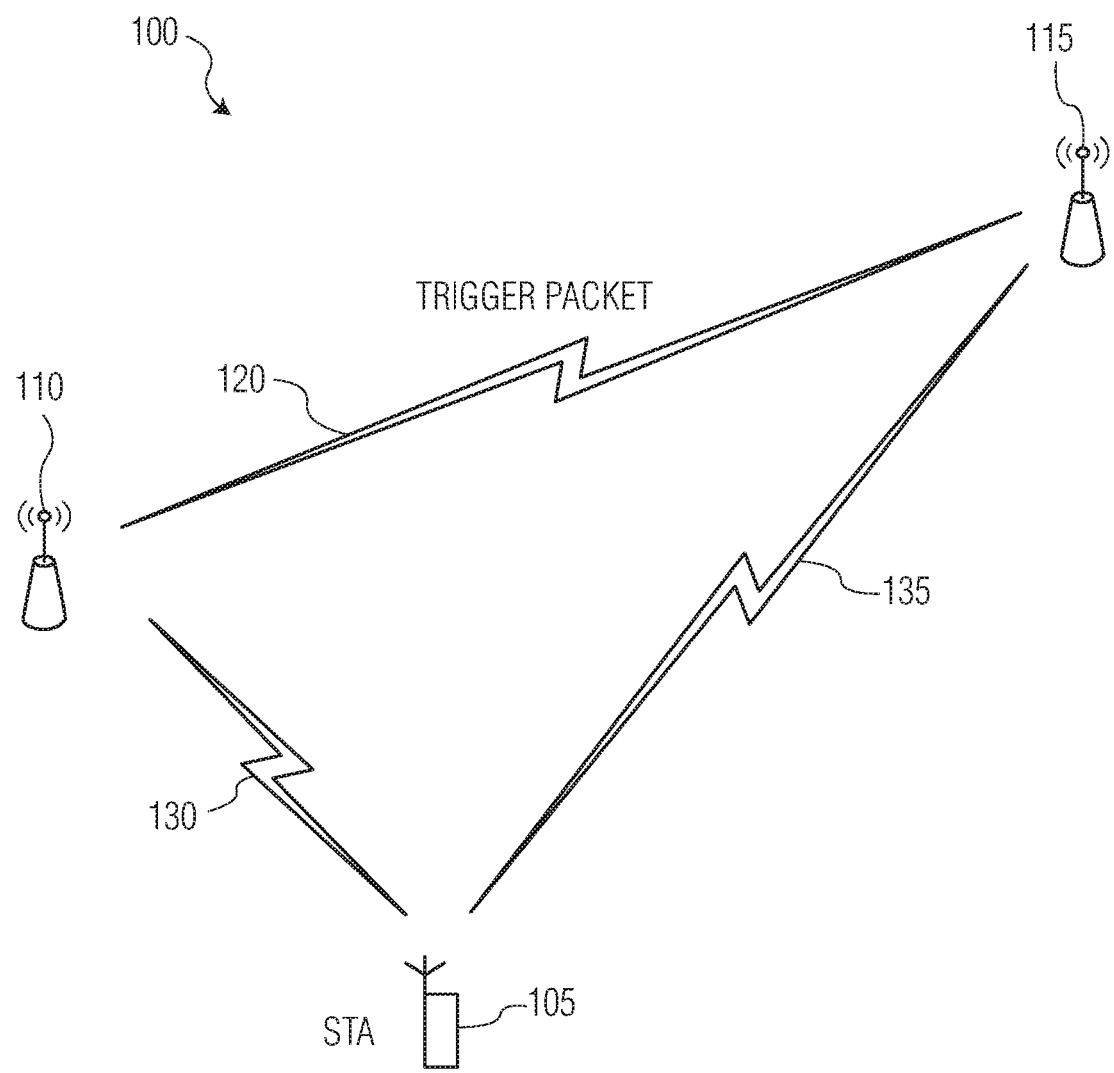
FIG. 1 illustrates a communication system where DMIMO is used by multiple access points to communication to a station.

FIG. 1 illustrates a communication system where DMIMO is used by multiple access points to communicate to a station. The AP 110 is the master AP or transmitter that controls the transmission to the station (STA) 105 (or client). A second AP 115 which is a slave AP is also used to communicate with the STA 105. Additional APs (not shown) may also be used to communicate with the station.

Figure 2:
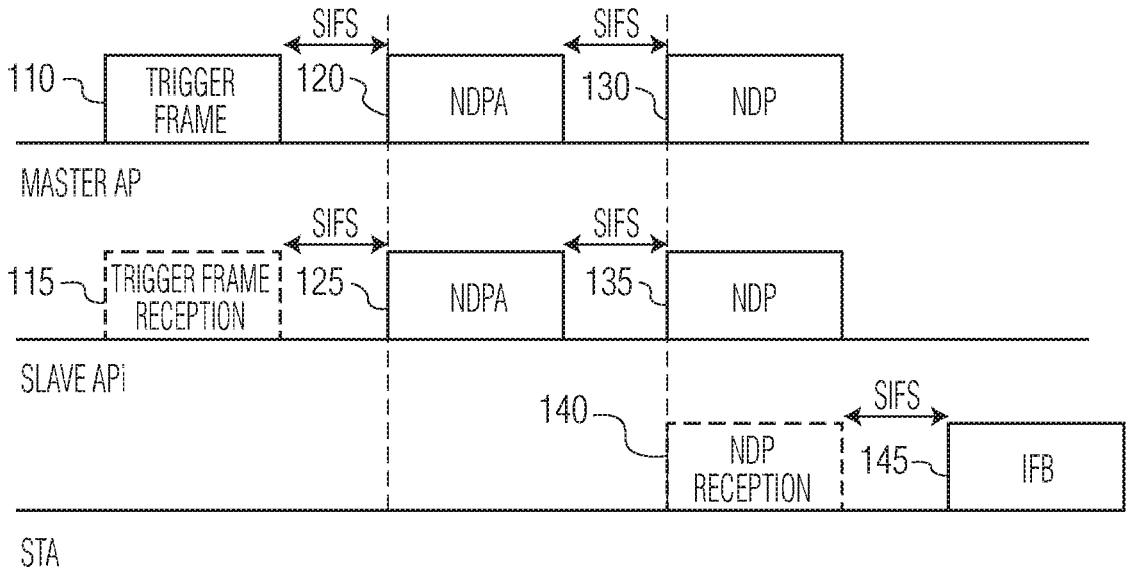
FIG. 2 illustrates the sounding a feedback to synchronize transmission between two APs and a station STA.
Figure 3:
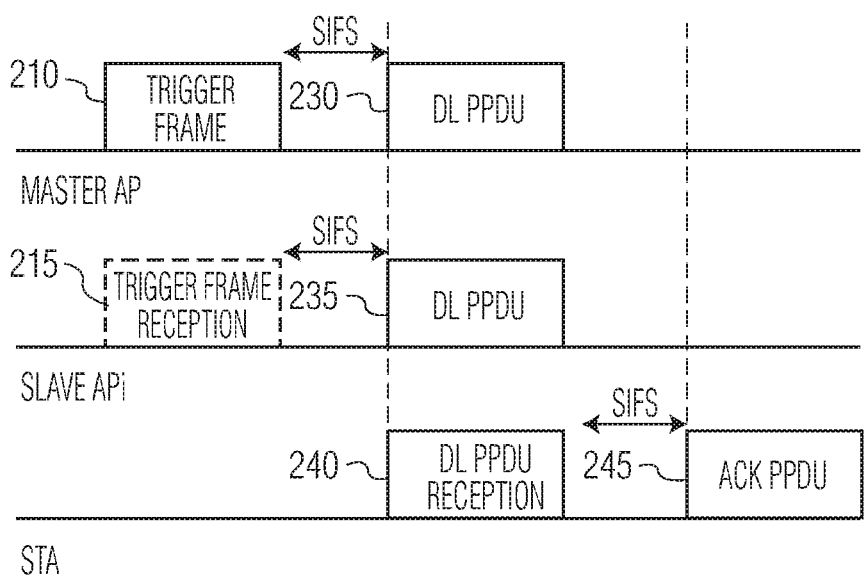
FIG. 3 illustrates synchronized data transmission from the master AP and the slave AP to the station STA.

FIGS. 2 and 3 illustrate a joint AP transmission protocol. FIG. 2 illustrates the sounding and feedback used to synchronize transmission between two APs and a station STA. The master AP sends out a trigger frame 110. The trigger frame 110 allows for synchronization of the transmissions from the master AP and any slave APs. The trigger frame 110 facilitates carrier frequency synchronization, timing synchronization, delay estimation, phase synchronization, MAC signaling, etc. The slave AP receives the trigger frame 115. Next, both the master AP and the slave AP transmit a null data packet (NDP) announcement (NDPA). This NDPA allows the slave AP to gain control of the channel. Next, the master AP and slave AP send out a NDP. The NDP allows for characterization of the frame and the calculation of the beamforming matrix. The STA receives the NDPs from the two APs and then computes the compressed feedback. It communicates this compressed to the APs through a feedback report IFB 145, and the APs use the feedback to form the precoder matrix which will be used in the DL DMIMO transmission.

FIG. 3 illustrates synchronized data transmission from the master AP and the slave AP to the station STA. The operation in FIG. 3 is similar to that in FIG. 2. The master AP sends out a trigger 210. As previously described, the trigger frame 210 allows for the various AP to synchronize their transmission. The slave AP receives the trigger frame 215. The master AP and slave AP then both transmit a download (DL) physical protocol data unit (PPDU), 230 and 235, respectively. The station STA receives the transmitted DL PPDUs and in response sends back an acknowledge message Ack PPDU 245. Because the DL PPDUs are synchronized, the station STA receives a signal with greater energy. For example, each transmitter has a peak power limitation and having more transmitters results in increased peak power of the transmission. As discussed above using beamforming may further increase the signal strength by steering the transmit and receive beams to thereby increase the antenna gain.

In other embodiments, the STA may also receive the trigger frame 110 from the master AP and use the trigger frame to synchronize its carrier frequency in order to reduce CFO. In yet another embodiment, the STA may initiate a synchronization process that may also help to synchronize the carrier frequency as well as other synchronization parameters.

There are various performance parameters that effect the use of beam forming with DMIMO. Carrier frequency offset (CFO) is the difference in carrier frequencies between the transmitting APs. Because the CFO from the different APs will accumulate independently, CFO compensation is not feasible. The common phase error (CPE) is not sufficient to completely remove the phase build up from CFO when multiple APs are transmitting.

Further, the carrier frequency in the APs drifts between the NDP and the steered data packet. Also, timing synchronization between the NDP and the steered data packets may degrade. Finally, the delay between the APs and the STA may not be adequately compensated.

Simulations have been used to show that for peak throughput performance, a CFO accuracy of about 20 Hz is required. For a user at the cell-edge, a CFO accuracy of about 50 Hz may be sufficient.

Embodiments of methods and systems to improve the performance of beamformed DMIMO will now be described. One approach is to use mid-ambles. Such mid-ambles may be similar to the mid-ambles described in the IEEE 802.11ax protocol. Another approach is to reconstruct the channels. Finally, the STF may be used to determine power fluctuations, so that the receiver may use gain adjustments to compensate for the power fluctuations. Each of these will be described in greater detail below.

First non-beamforming (BF) transmission will be described. The receive signal for non-BF transmission may be modeled as follows:

$$Y_n(k) = \sum_{i=1}^{N_{AP}} e^{1j*2\pi\Delta f_i n} H_i(k) Q_i(k) X_n(k) + z \qquad \text{equation 1}$$
$$= H_{\textit{eff},n}(k) X_n(k) + z,$$

where:
$n$–$n^{th}$ OFDM symbol ($0^{th}$ symbol is first LTF), k–$k^{th}$ tone, $N_{AP}$–#of transmitters;
$X_n$–$N_{ss} \times 1$ transmitted signals;
$Y_n$–$N_r \times 1$ received signals;
$H_i$–$N_r \times N_{tx,i}$ channel between $i^{th}$ transmitter and receiver;
$Q_i$–$N_{tx,i} \times N_{ss}$ spatial mapping or precoder matrix used at $i^{th}$ transmitter;
$z$–$N_r \times 1$ AWGN noise;
$\Delta f_i$–CFO between $i^{th}$ transmitter and the receiver; and $$H_{\textit{eff},n}(k) = \Sigma_{i=1}^{N_{AP}} e^{1j*2\pi\Delta f_i n} H_i(k) Q_i(k).$$

The $\Delta f_i$ which is the CFO between $i^{th}$ transmitter and the receiver cannot be estimated by the client station, so this is the problem that the embodiments described herein seek to solve.

It is assumed that channel estimation is performed in $0^{th}$ symbol, i.e., $H_{est} = H_{\textit{eff},0}$, and the channel estimate $H_{est}$ is used to equalize the channel. The channel estimate $H_{est}$ cannot effectively be used to equalize all the OFDM symbols, as the channel is varying across the symbols because of the phase build-up ($2\pi\Delta f_i n$) from CFO. The performance is severely degraded when the duration of the packet increases. As described above, the following solutions are proposed: 1) use mid-ambles as in 802.11ax packet; and 2) reconstruction of channels for each symbol.

Mid-ambles were introduced in 802.11ax to tackle the channel aging effect. The different CFO phase accumulation in DMIMO transmission can be treated as channel aging and periodic mid-ambles may be sent to enable the receiver to re-estimate the channel. For example, a training symbol may be sent every 10 symbols, and the number of symbols between the mid-ambles may be selected so that the channel variation over the number of symbols is within acceptable limits. Then the re-estimated channel is used to equalize the packet until next mid-amble is sent. This will help to compensate for the accumulated phase error due to the CFO between the APs and the client station STA. Accordingly, this new use of mid-ambles after a certain number of symbols when multiple APs are transmitting provides a performance improvement because of the presence of CFO.

An embodiment for re-construction of the channel will now be described. The channel variation because of CFO between the different transmitters and the receiver is correlated. As a result, to re-construct the channel individual estimates of $H_i(k)Q_i(k)=H'_i(k)$ and an estimate of $\Delta f_i$ will be calculated. This may be done by using a specific LTF structure and process.

First the time domain solution using the LTF will be described. In is approach each transmitter will have its own LTF. This will allow the receiver to estimate the channel between the receiver and each transmitter. When an individual transmitter is transmitting using a HE-LTF, the other transmitters will be idle, i.e., $$X_{LTF}^{[i]}=[0^{[1]}, \ldots 0^{[i-1]}, LTF_s, 0^{[i+1]}, \ldots, 0^{[N_{AP}]}], \quad \text{equation 2}$$

where $0^{[x]}$ is a set of Nss OFDM symbols with zero signal, LTF is a set of $N_{LTF}$ OFDM symbols used to estimate the channel corresponding to Nss streams, and $X_{LTF}^{[i]}$ is $N_{AP} \times N_{LTF}$ OFDM symbol training signal from the $i^{th}$ transmitter. The receiver estimates the first transmitter channel based on first set of HE-LTF, and second transmitter channel based on second set of HE-LTF and so on as follows:

$$Y_{LTF}^{[i]}=[H'_1 \times LTF_s, \ldots, H'_i \times LTF_s, \ldots, H'_{N_{AP}} \times LTF_s].$$

Then a common unitary matrix across all transmitters may be applied on $X_{LTF}^{[i]}$; i.e., $X_{LTF}^{[i]} \times U$ will be transmitted to avoid transmitting $0^{[\cdot]}$ OFDM symbols. U may be any unitary matrix (e.g., a Hadamard matrix may be used). The receiver will perform inverse of U to remove the signals from the unwanted channels before estimating the individual channel matrix.

Co-ordination is required for this LTF transmission. As in equation 2 for $X^{[i]}_{LTF}$, only one AP has the signal active for any given OFDM symbol during LTF transmission. The $LTF_s$ is a unitary matrix which the client will remove to get the channel estimate from the corresponding $X^{[i]}_{LTF}$ will be sent synchronously, so that the receiver will be able to estimate the channel independently. The receiver will receive the multiple LTFs and process them accordingly. Note that this format of LTFs are transmitted only during DMIMO transmission, and are not required during NDP. In one embodiment, this may be the only LTF format defined for DMIMO transmission in which case receiver will process the received LTFs for this specific LTF design. In another embodiment, if this different LTF design is allowed during DMIMO transmission, then a signaling is done during preamble portion of DMIMO transmission indicating to receiver to process the LTFs for this format.

Next the frequency domain solution for the LTF will be described. The frequency tones are divided into sub-sets such that the sub-sets are interleaved, i.e., sub-set1={0, k, 2k, . . . }, sub-set2={1, k+1, 2k+1, . . . }, and so on. Each sub-set is assigned to a transmitter during the LTF portion of the transmission. The receiver estimates the first transmitter channel based on the sub-set 1 tones, the second transmitter channel based on sub-set 2 tones, and so on. One or more sub-sets may be used for the transmitter. An interpolator is used to estimate the channel of each transmitter for the non-estimated tone index. For example, when the first subset is used, the receiver will estimate the channels for frequency tones 1, 2, and 3 based upon the estimates for frequency tones 0 and 4. This approach does not increase the length of the transmission, and the receiver needs to be able to process the different subsets to do the channel estimates.

To provide a more concrete example, assume that in the LTF the sub-sets are defined as: sub-set 1={0, 4, 8, . . . }, sub-set 2={1, 5, 9, . . . }, sub-set 3={2, 6, 10, . . . }, sub-set 4={3, 7, 11, . . . }. The number of subsets will be signaled to the client in the preamble portion of the DMIMO transmission and not during synchronization message.

If there are 4 transmitters, then each sub-set will be assigned to an individual transmitter. Alternatively, if there are 2 transmitters, then sub-set1 and sub-set3 may be assigned to transmitter 1 and sub-set 2 and sub-set 4 may be assigned to transmitter 2.

If there are more than 4 transmitters using these 4 subsets, then the time domain LTF design may be combined along with frequency domain LTF design. Consider 8 transmitters, then 2 sets of time domain LTFs may be used, and within each time domain LTF, the channels of 4 transmitters may be estimated with the 4 sub-sets of frequency tones.

Two options for estimating $\Delta f_i$ will be described based upon the channel estimates. In the first option the received signal at pilot locations ($k_{pilot}$) will be:

$$Y_n(k_{pilot})=\sum_{i=1}^{N_{AP}} e^{1j*2\pi \Delta f_i n} H'_i(k_{pilot}) x_n(k_{pilot})+z= (\sum_{i=1}^{N_{AP}} e^{1j*2\pi \Delta f_i n} H_{i,pilot}(k_{pilot})) x_n(k_{pilot})+z,$$

where $1_{N_{rx} \times 1}$ is a unit vector and $x_n(k_{pilot})$ is the polarity of the pilot. $H_{i,pilot}(k_{pilot})$ may be estimated from the independent channel estimates. Removing the pilot signal which is common across all transmitters from the received signal results in, $$Y'_n(k_{pilot}) = \sum_{i=1}^{N_{AP}} e^{1j*2\pi \Delta f_i n} H_{i,pilot}(k_{pilot}) + z'$$

$$= [H_{1,pilot}, \ldots, H_{N_{AP},pilot}](k_{pilot}) \times \begin{bmatrix} e^{1j*2\pi \Delta f_1 n} \\ \vdots \\ e^{1j*2\pi \Delta f_{N_{AP}} n} \end{bmatrix} + z'$$

$$Y'_n(k_{pilot}) = H_{pilot}(k_{pilot}) \times \begin{bmatrix} e^{1j*2\pi \Delta f_1 n} \\ \vdots \\ e^{1j*2\pi \Delta f_{N_{AP}} n} \end{bmatrix} + z'$$

where $H_{pilot}(k_{pilot})$ is a $N_{rx} \times N_{AP}$ matrix, and where $N_{rx}$ is the number of receive antennas, and $N_{AP}$ is the number of transmitting APs. The $H_{pilot}(k_{pilot})$ is available because of the above independent channel estimation proposed training sequences. Then the $H_{pilot}(k_{pilot})$ may be removed to get the $\Delta f_i$ independently for each transmitter.

Because $\Delta f_i$ are constant across pilot locations, the values across multiple pilots can be appended to form $$Y'_n = H_{pilot} \times \begin{bmatrix} e^{1j*2\pi \Delta f_1 n} \\ \vdots \\ e^{1j*2\pi \Delta f_{N_{AP}} n} \end{bmatrix} + z',$$

where $Y'_n = \begin{bmatrix} Y'_n(k_{pilot}(1)) \\ \vdots \\ Y'_n(k_{pilot}(N_{pilot})) \end{bmatrix}$, and $$H_{pilot} = \begin{bmatrix} H_{pilot}(k_{pilot}(1)) \\ \vdots \\ H_{pilot}(k_{pilot}(N_{pilot})) \end{bmatrix}$$

Solution to above equation gives $\Delta f_i$.

The following is a simpler solution to finding $\Delta f_i$. Finding a pseudo inverse of a matrix is computationally expensive. Instead of finding inverse of $H_{pilot}(Nr*N_{pilot} \times N_{AP})$, many small inverses may be computed. Form $$Y'_{n,M} = H_{pilot}(\mathcal{M}^l) \times \begin{bmatrix} e^{1j*2\pi\Delta f_1 n} \\ \vdots \\ e^{1j*2\pi\Delta f_{N_{AP}} n} \end{bmatrix} + z',$$

where $Y'_n = \begin{bmatrix} Y'_n(k_{pilot}(m_1^l)) \\ \vdots \\ Y'_n(k_{pilot}(m_M^l)) \end{bmatrix}$, and $H_{pilot}(m) = \begin{bmatrix} H_{pilot}(k_{pilot}(m_1^l)) \\ \vdots \\ H_{pilot}(k_{pilot}(m_M^l)) \end{bmatrix}$ such that $(Nr*M > N_{AP})$.

Here $m_1^i \in \mathcal{M}^i$, $|\mathcal{M}^i| = M$, $\mathcal{M}^i$ is the subset of the total pilots available, $1-1^{th}$ subset of pilots. Note that $\mathcal{M}^{l_1} - \mathcal{M}^{l_2}$ need be not a null set. Then, $\Delta f_i$ may be estimated for each $\mathcal{M}^l$, and averaged across all the estimates available. If $Nr > N_{AP}$ then $|\mathcal{M}^i|$ can be 1. i.e., $\Delta f_i$ may be estimated from each pilot tone independently and then averaged across pilot tones to get better estimates. Note that the described configuration is an example, even for this case $|\mathcal{M}^i|$ need not be 1. The averaging across all tones may include either averaging of $\Delta f_i$ estimates or averaging $e^{1j*2\pi\Delta f_i n}$ estimates and then computing $\Delta f_i$ from that average.

In the second option, an orthogonal set of pilot tones is used at each transmitter. The signaling to the receiver specifying this orthogonal set of pilot tones is through preamble portion of DMIMO transmission The pilot tones defined for non-DMIMO transmission may be distributed among transmitters. Also, additional pilot tones may be introduced in DMIMO packet transmission, and the pilot indices are equally divided among the transmitters. The received signal at pilot tone is:

$Y_n(k_{pilot,i}) = e^{1j*2\pi\Delta f_i n} H'_i(k_{pilot,i}) 1_{N_{tx,i} \times 1} x_n(k_{pilot,i}) z,$ where $k_{pilot,i}$ is the pilot tone location from $i^{th}$ transmitter. The $\Delta f_i$ of an $i^{th}$ transmitter is estimated from the corresponding pilot location. Instead of sending zeros in the other transmitter pilot locations, the pilots are spread across all tones using an orthogonal matrix. The receiver may undo the orthogonal matrix across pilots before estimating $\Delta f_i$. This is similar to sending orthogonal LTFs from different transmitters for independent channel estimates. This approach may reduce the complexity for estimating $\Delta f_i$.

Once the receiver has calculated the CFO estimate $\Delta f_i$, the channel may be re-constructed. The receiver calculates:

$\hat{H}_{eff,n}(k) = \sum_{i=1}^{N_{AP}} e^{1j*2\pi\Delta f_i n} \widehat{H'_i(k)}$ based on the individual channel estimate $(\widehat{H'_i(k)})$, and the CFO estimate ($\Delta f_i$). The re-constructed channel is used to equalize the received signal $Y_n(k)$. This equalization operation may be performed every symbol or once in N symbols based on the channel estimate accuracy required. How often the channel is reconstructed results in a tradeoff between accuracy and performance versus complexity, computation, and power consumption at the receiver.

The discussion so far has not addressed beamforming. In 802.11, channel estimation from NDP is used to compute the precoder Q which is used in beamforming. The receiver may feedback the channel estimate to the transmitters which may then compute the precoder Q. The precoder may vary depending upon whether there is a single transmitter or multiple transmitters. In DMIMO transmission, a common precoder is computed across all transmitters. The signal model in steered packet of DMIMO transmission is as shown above in equation 1. $Q_i$ is the precoder to be used at the $i^{th}$ transmitter, and $\Delta f_i$ corresponds to the residual CFO after CFO pre-compensation is applied at each transmitter. The presence of $\Delta f_i$ will significantly degrade the performance. The presence of $\Delta f_i$ also results in the power of the OFDM symbol fluctuation with symbol index.

It is noted that the power fluctuation of the OFDM channels cannot be handled by the above two proposals. Power fluctuations may be handled by sending a short training field (STF) sequence periodically similar to the mid-amble. A STF sequence may be sent periodically for allowing the AGC of the client to get adjusted. When a mid-amble is sent the STF sequence may be sent just before the mid-amble sequence. The periodicity of STF sequence may be the same or may be longer than mid-amble, i.e., the STF sequence may be sent once for every 2 or 3 mid-amble sequences.

When the mid-amble is not used the STF periodicity can be maintained similar to that of the case when mid-amble is sent. In the example of WiFi, the STF sequence need not be 4 us long as currently specified, as the client needs to adjust for drop in signal amplitude. The STF sequence may be 1.6 us or 2.4 us long.

When a mid-amble does not immediately follow the STF, a phase correction and amplitude correction will need to be performed after the gain adjustment. The phase and amplitude correction is not required if channel estimation using the mid-amble is performed after AGC gain adjustment.

Phase and magnitude correction may be performed as follows. At a pilot location the signal after removal of pilot polarity is stored and compared against the pilot signal after the AGC adjustment for each receive antenna independently. For example, if $Y'_n(N_r \times 1)$ represent the signal at pilot location just before the STF sequence i.e., before gain adjustment, and $Y'_{n+1}(N_r \times 1)$ represents the signal at pilot location just after the STF sequence i.e., after gain adjustment then compute:

$$\alpha_l = \frac{Y'_{n+1}(l)}{Y'_n(l)},$$

where 'l' is the receive antenna index. Then $\alpha_l$ may be averaged over all the available pilot locations. This results in a new channel estimate to be used post equalization as $H_{est} = \text{diag}(\alpha_1, \ldots, \alpha_{N_r}) \times H_{est}$.

The previous proposal of sending STF sequence requires transmitter changes, i.e., inserting STF sequence in the data portion of the packet as well as loss in throughput. Now an alternate proposal to handle the power fluctuation at receiver is described. In IEEE 802.11ax, three cyclic prefix (CP) durations are used during data portion: {0.8, 1.6, 3.2} us. When the CP duration is 3.2 us or 1.6 us long, it is sufficient time for gains to settle if the gain adjustment is initiated during the end of previous symbol. Receiver processing first includes measuring the power of each OFDM symbol as well as the power of the initial channel estimate or the first data OFDM symbol. If the power drops below a certain threshold, then a gain adjustment command is issued to the AGC at the end of the previous OFDM symbol. As a result, before the CP duration ends, the gain adjustment should have settled if CP duration is 3.2 or 1.6 us.

Whenever gain adjustment is done, the phase and magnitude correction discussed above needs to be applied if mid-amble does not follow immediately.

The receiver may carry out the following steps to correct for CFO. For BF transmission, $\Delta f_i$ corresponds to the residual CFO after CFO pre-compensation is applied at each transmitter. The BF gain decreases as $\Delta f_i$ increases. There are two types of synchronization: AP initiated and client initiated.

In client initiated DMIMO where synchronization signal is sent from client, all the APs will synchronize the CFO with respect to the client. In AP initiated DMIMO, the synchronization signal is sent from master AP, and all the other APs will synchronize with respect to the master AP. For single AP transmission there is no CFO synchronization between AP and client, so the client has to perform CFO estimation and correction based on the received packet. Usually the estimation is done using the training OFDM symbol and preamble OFDM symbol. In the preamble portion the receiver will estimate the CFO and correct for it during the data processing.

In certain situations, the initial CFO correction at the receiver may not be performed. For client initiated DMIMO, because all the APs are synchronized with respect to the client, the client need not perform the CFO estimation and correction as in the single AP case. Only the residual CFO $\Delta f_i$, estimation and correction discussed above will be performed, for example, using mid-ambles or channel re-construction.

For AP initiated DMIMO, the client is not synchronized with any of the APs, so the client has to perform initial CFO estimation and correction as in single AP case. The residual uncorrected CFO $\Delta f_i$ needs to be estimated and corrected as discussed above. The signal model discussed above is after the initial CFO estimation and correction is done. All of the APs will synchronize CFO with respect to the master AP using the synchronization packet sent before the DMIMO transmission.

Alternatively, the client may also synchronize CFO with respect to the master AP using the same synchronization packet. In this situation, the initial CFO estimation and correction is not required as the client applies the correction factor based on estimated CFO from the master AP.

Figure 4:
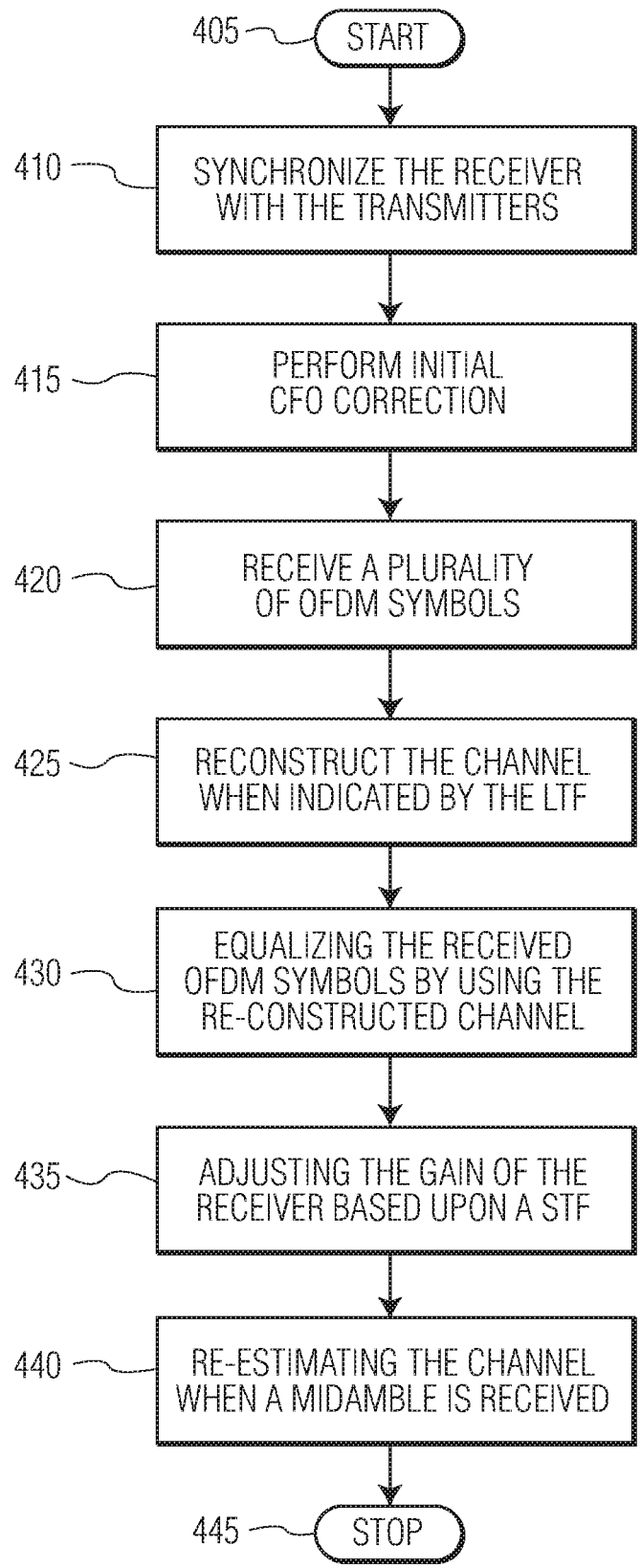
FIG. 4 illustrates a flow diagram showing the processing flow for a receiver.

FIG. 4 illustrates a flow diagram showing the processing flow for a receiver. The process starts at 405 and then the receiver synchronizes with the transmitters 410. As described above various aspects and parameters are synchronized. Next, the receiver performs the initial CFO correction. As described above this correction may also be included in certain synchronization schemes. Then the receiver receives a plurality of OFDM symbols 420. These various symbols may include all the different types of symbols that are present in an OFDM transmission. When an LTF is received that uses time-domain or frequency domain LTF design to re-construct the channel, they are processed to estimate the CFO and then re-construct the channel as described above 425. The received OFDM symbols are then equalized using the re-constructed channel 430. Further, the receiver may adjust the gain of the receiver based upon an STF that is used to adjust the gain as described above 435. Next, when midambles are received, the channel may be re-estimated as described above 440. The process then ends at 445. It is noted that the various steps in the flow may be included or excluded leading to using various combinations of techniques for compensating for CFO.

Figure 5:
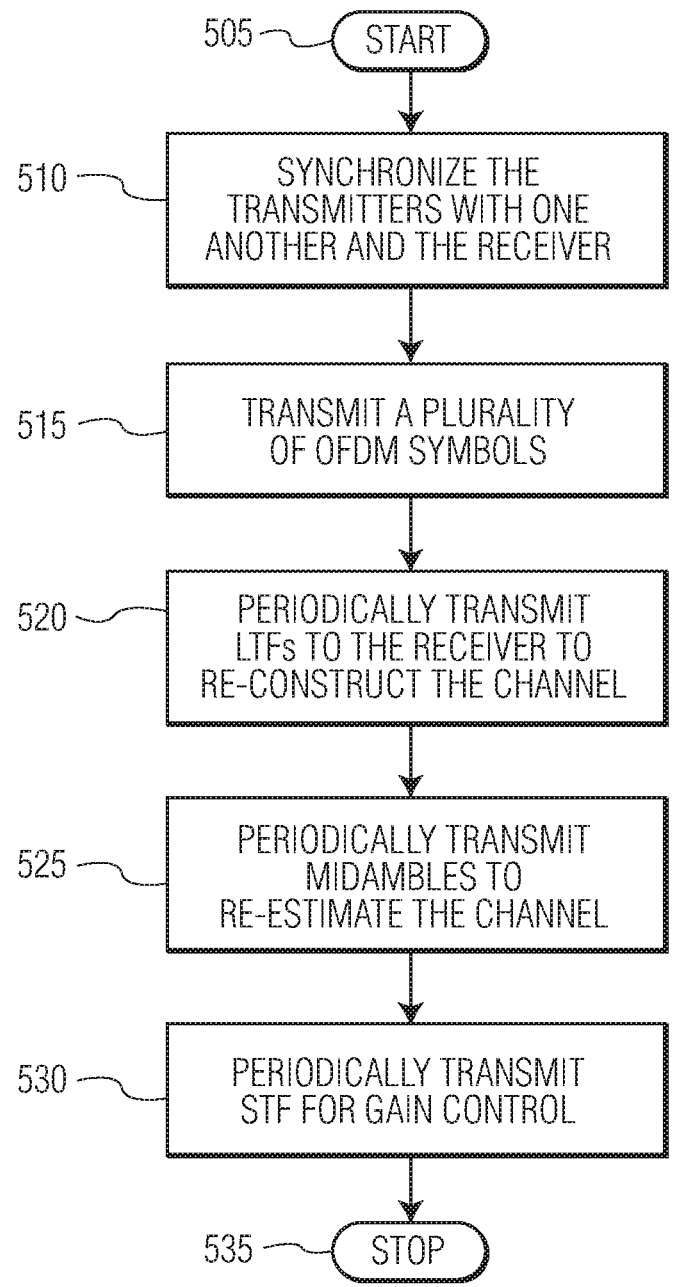
FIG. 5 illustrates a flow diagram showing the operation of a transmitter.

FIG. 5 illustrates a flow diagram showing the operation of a transmitter. The process starts at 505, and then the transmitters synchronize with one another and the receiver 510. This may be accomplished as described above. Next, the transmitters transmit a plurality of OFDM symbols 515. Further, the transmitters may periodically transmit LTFs to the receiver that may be used to re-construct the channel 520. This may be done using the various time and frequency domain approaches described above. Next, the transmitters may periodically transmit midambles so that the receiver may re-estimate the channel as described above 525. Then the transmitters may periodically transmit STFs for gain control as described above 530. The process then ends at 535. It is noted that the various steps in the flow may be included or excluded leading to using various combinations of techniques for compensating for CFO.

The system and method described herein may be carried out using specific hardware to perform the actions or software running on a processor may implement the embodiments. The processor may be connected to memory and storage, where the software instructions are stored in the storage. The processor may be any general purpose processor, a graphics processor, a signal processor, or any other type of specialized processor.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method for processing distributed multiple-input and multiple-output (DMIMO) orthogonal frequency-division multiplexing (OFDM) signals received by a receiver from a plurality of transmitters which transmits the DMIMO OFDM signals over a channel, the method comprising:
    performing an initial carrier frequency offset (CFO) correction;
    receiving a plurality of OFDM symbols;
    estimating a residual CFO for each of the transmitters based upon a long training field (LTF);
    re-constructing the channel every N symbols based upon a channel estimate for each transmitter and the estimate of the residual CFO for each of the transmitters, wherein N is an integer; and
    equalizing the received OFDM symbols using the re-constructed channel.

2. The method of claim 1, wherein the LTF includes a plurality of LTFs wherein each LTF is associated with a transmitter of each of the plurality of transmitters and wherein estimating the residual CFO for each transmitter is based upon its associated set of LTF.

3. The method of claim 1, further including a plurality of LTFs wherein each LTF is associated with a subset of transmitters the plurality of transmitters,
wherein each of the plurality of LTFs associated with the subset of transmitters includes a plurality of subsets of interleaved frequency tones,
wherein each of the plurality of subsets of interleaved frequency tones is associated with one transmitter in the subset of transmitters, and
wherein the residual CFO estimate for each of the transmitters is based upon the subset frequency tones and LTF associated with the transmitter.

4. The method of claim 1, wherein
the LTF includes a plurality of subsets of interleaved frequency tones,
each of the plurality of subsets is associated with one of the plurality of transmitter, and
the residual CFO estimate for each of the transmitters is based upon the subset associated with the transmitter.

5. The method of claim 4, wherein the channel estimate for each of the transmitters includes interpolating the channel estimate for frequency tones outside the subset of frequency tones for each transmitter.

6. The method of claim 4, wherein estimating a residual CFO includes estimating the residual CFO for each of a plurality of subsets of received pilot tones and averaging the plurality of estimated residual CFOs for each of the plurality of subsets.

7. The method of claim 4, wherein estimating a residual CFO includes assigning a pilot tone to each of the plurality of transmitters from a set of orthogonal transmit pilot tones and estimating the residual CFO for each of the plurality transmitters based upon the assigned pilot tone.

8. The method of claim 1, further comprising receiving a mid-amble every M symbols, wherein the mid-amble is used to re-estimate the channel and M is an integer.

9. The method of claim 1, wherein performing the initial CFO correction is part of a receiver initiated synchronization request.

10. The method of claim 1, wherein performing the initial CFO correction is part of a master transmitter initiated synchronization request and wherein the receiver responds to the synchronization request.

11. The method of claim 1, further comprising periodically receiving an STF sequence and adjusting a gain of the receiver based upon the received STF.

12. A device for processing received distributed multiple-input and multiple-output (DMIMO) orthogonal frequency-division multiplexing (OFDM) signals from a plurality of transmitters, comprising:
a receiver configured to:
perform an initial carrier frequency offset (CFO) correction;
receive a plurality of OFDM symbols;
a residual CFO estimator configured to estimate a residual CFO for each of the transmitters based upon a long training field (LTF);
a channel re-constructor configured to re-construct the channel every N symbols based upon a channel estimate for each transmitter and the estimate of the residual CFO for each of the transmitters, wherein N is an integer; and
an equalizer configured to equalize the received OFDM symbols using the re-constructed channel.

13. The device of claim 12, wherein the LTF includes a plurality of LTFs wherein each LTF is associated with a transmitter of each of the plurality of transmitters and wherein estimating the residual CFO for each transmitter is based upon its associated set of LTF.

14. The device of claim 12, wherein the LTF includes a plurality of LTFs wherein each LTF is associated with a subset of transmitters the plurality of transmitters,
wherein each of the plurality of LTFs associated with the subset of transmitters includes a plurality of subsets of interleaved frequency tones,
wherein each of the plurality of subsets of interleaved frequency tones is associated with one transmitter in the subset of transmitters, and
wherein the residual CFO estimate for each of the transmitters is based upon the subset frequency tones and LTF associated with the transmitter.

15. The device of claim 12, wherein
the LTF includes a plurality of subsets of interleaved frequency tones,
each of the plurality of subsets is associated with one of the plurality of transmitter, and
the residual CFO estimate for each of the transmitters is based upon the subset associated with the transmitter.

16. The device of claim 15, wherein the channel estimate for each of the transmitters includes interpolating the channel estimate for frequency tones outside the subset of frequency tones for each transmitter.

17. The device of claim 15, wherein estimating a residual CFO includes estimating the residual CFO for each of a plurality of subsets of received pilot tones and averaging the plurality of estimated residual CFOs for each of the plurality of subsets.

18. The device of claim 15, wherein estimating a residual CFO includes assigning a pilot tone to each of the plurality of transmitters from a set of orthogonal transmit pilot tones and estimating the residual CFO for each of the plurality transmitters based upon the assigned pilot tone.

19. The device of claim 12, wherein the receiver is further configured to receive a mid-amble every M symbols, wherein the mid-amble is used to re-estimate the channel and M is an integer.

20. The device of claim 12, wherein performing the initial CFO correction is part of a receiver initiated synchronization request.

21. The device of claim 12, wherein performing the initial CFO correction is part of a master transmitter initiated synchronization request and wherein the receiver responds to the synchronization request.

22. The device of claim 12, wherein the receiver is further configured to periodically receive an STF sequence and adjust the gain of the receiver based upon the received STF.

* * * * *